United States Patent [19]
Takanoyama et al.

[11] 3,817,101
[45] June 18, 1974

[54] FLOW METER

[75] Inventors: Tasaku Takanoyama; Yasuo Mori, both of Tokyo, Japan

[73] Assignee: Tokyo Keiso Kabushiki Kaisha, Tokyo, Japan

[22] Filed: Jan. 8, 1973

[21] Appl. No.: 321,698

Related U.S. Application Data

[63] Continuation-in-part of Ser. No. 165,679, July 23, 1971, abandoned.

[52] U.S. Cl. ................................................. 73/228
[51] Int. Cl. ............................................ G01f 1/100
[58] Field of Search ...................................... 73/228

[56] References Cited
UNITED STATES PATENTS
1,249,484 12/1917 Pogue ................................. 73/228
3,424,001 1/1969 Young ................................. 73/228

*Primary Examiner*—Herbert Goldstein
*Attorney, Agent, or Firm*—Spensley, Horn and Lubitz

[57] ABSTRACT

An apparatus responsive to the flow of a fluid through a positioned flow passage utilizing an aerodynamic drag means positioned in cooperative relationship to the flow through the passage. The aerodynamic drag means has in operative relation thereto means for transmitting a signal corresponding to the positional deviation resulting from the flow of the fluid through the passage.

5 Claims, 3 Drawing Figures

PATENTED JUN 18 1974 3,817,101

TASAKU TAKANOYAMA
YASUO MORI
INVENTORS

BY
Spensley, Horn & Lubitz
ATTORNEYS

FLOW METER

This is a continuation-in-part application of our application Ser. No. 165,679 filed July 23, 1971 now abandoned.

BACKGROUND OF THE INVENTION

1. Field of the Invention

The present invention generally relates to fluid flow meters and, in particular, to those meters measuring the rate of flow by the detection of positional deviation.

2. Prior Art

The prior art is replete with subject matter covering flow meters utilizing the characteristic of positional deviation for the measurement of the rate of flow of a fluid. One of the devices disclosed by the prior art utilizes an aerodynamic drag means which is axially disposed within the flow passage of the fluid whose rate of flow is being measured. The aerodynamic drag means typically comprises the magnetic core of a differential transformer. The movement of the core between the implanted windings of the differential transformer yields a signal which is responsive to the rate of flow. The problem inherent in this device is the restriction imposed by the positioning of the differential transformer. In addition, the passage presented by the recesses within which the windings are imbedded restricts the flow of the fluid in a manner which limits its use. When large volumes of fluid are present, or where the rate of flow of the fluid is low, a small flow passage will cause degraded operation. Where low flow rates are present or where the volume of fluid is large, the pressure drop across a small flow passage will significantly affect the operation of the total flow system. The present invention substantially resolves this problem by providing a large volume passage within which a drag member is disposed. The drag member is axially deflected within the measuring passage, the drag member being coupled to means for producing an electrical signal in response to the positional deviation thereof.

Another device disclosed by the prior art utilizes the measurement of strain produced in a deflected member to yield a signal responsive to the rate of flow of a fluid. A cantilevered member is placed in a strained condition by anchoring one end thereof, the second end of the member being deflected by the moving fluid. The difficulty inherent in this device is again the restriction imposed on the fluid passage as a result of the axial disposition of the deflected end of the cantilevered member. The present invention substantially solves this problem by disposing an aerodynamic drag member within a large volume passage which will permit the measurement of low flow rates as well as the measurement of high fluid flow rates without deleteriously affecting the passage of the fluid.

SUMMARY OF THE INVENTION

A salient feature of the present invention apparatus is the use of a moveable aerodynamic drag member adapted to be deflected upon being brought in contact with a moving fluid. The strength of the pressure imposed by the fluid is proportional to the size of the passage within which the aerodynamic drag member is disposed, the deviation of the aerodynamic drag member being varied in accordance with the change of the dynamic pressure. The positional deviation produces an electrical signal responsive to such positional deviation, the electrical signal being proportional to the flow rate.

A flow meter fabricated in accordance with the present invention contains no components which will require frictional movement against one another. The deflection of the aerodynamic drag member is coupled to means for producing an electrical signal responsive to the positional deflection of the drag member. The means for producing a signal responsive to the deflection exhibits low fluid turbulence and therefore makes it possible to obtain measurement values which are highly reliable.

It is therefore an object of the present invention to provide an improved flow meter.

It is another object of the present invention to provide an improved flow meter utilizing electrical signals responsive to positional deviation.

It is yet another object of the present invention to provide a flow meter capable of measuring low fluid-flow rates.

It is still yet another object of the present invention to provide an improved flow meter which is inexpensive and simple to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intented as a definition of the limits of the invention.

DESCRIPTION OF THE PRESENTLY PREFERRED EMBODIMENT

Figure 1:
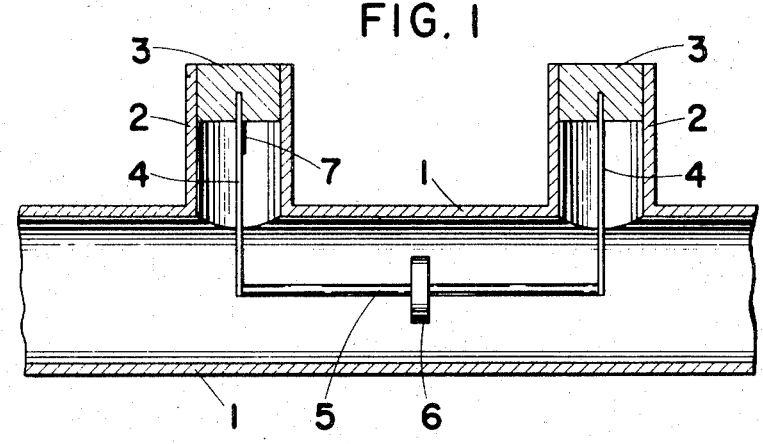
FIG. 1 is a schematic, cross-sectional view of a form of a flow meter for measuring indicia responsive to the linear deflection of an axially disposed drag member.

An understanding of the present invention can be best gained by reference to FIG. 1 where there is shown a pipe 1 adapted for the passage of a fluid. On the upper side of pipe 1 are provided two suitably spaced branch pipes 2 both of which are in communication with the passage of pipe 1. The upper terminus of pipes 2 are closed with plugs 3.

The bottom portions of plugs 3 in branch pipes 2 are adapted to receive the ends of a pair of leaf springs 4. The opposing ends of leaf springs 4 are coupled to a shaft 5 which is axially disposed within the passage of pipe 1. Intermediate the connection between shaft 5 and leaf springs 4 is an aerodynamic drag member 6 which is responsive to the force imposed by a fluid passing through pipe 1. Aerodynamic drag member 6 is centrally disposed between leaf springs 4 upon shaft 5.

As stated previously, an object of the present invention is to provide means whereby the flow rate of the fluid passing through pipe 1 can be measured by the positional displacement of an aerodynamic drag member. Since the positional deflection of aerodynamic drag member 6 and shaft 5 will cause leaf springs 4 to be deflected, an appropriate transducer or strain gauge 7 is securely coupled to one of the leaf springs 4. Strain gauge 7 is attached to leaf springs 4 to respond to the strain produced in leaf springs 4. As is well known in the art, an electrical bridge circuit is incorporated with strain gauge 7 whereby the amount of mechanical strain produced in leaf spring 4 will be transposed into an electrical signal which is responsive to the positional deflection of aerodynamic drag member 6. The output signal from strain gauge 7 is measured by detecting the unbalanced electrical current produced in the bridge circuit, the manner of measuring the responsive signal being well known to persons having skill in the art.

When fluid passes through the passage of pipe 1, the pressure imposed by the laminar flow of the fluid is imposed upon the aerodynamic drag member 6 causing the moveable shaft 5 to be axially deflected against the restraining force of leaf springs 4. Moveable shaft 5 will undergo a positional deflection along the axis of pipe 1, the positional deflection being proportional to the force imposed by the flow of the fluid against aerodynamic drag member 6. When the force imposed by the fluid is equivalent to the restaining force imposed by leaf springs 4, the positional deflection of moveable shaft 5 will be terminated. In this case, the force imposed by the laminar flow of the fluid in pipe 1 operating on aerodynamic drag member 6 is a function of the flow rate of the fluid flowing in pipe 1, and therefore the strain produced in leaf spring 4 will be proportional to the force of the fluid flow and thereby proportional to the flow rate.

As mentioned above, one of leaf springs 4 such as shown in FIG. 1 is coupled to an appropriate strain gauge 7. Since strain gauge 7 typically comprises a transducer which will output an electrical signal responsive to the strain in the coupled leaf springs 4, the output of strain gauge 7 will be responsive to the flow rate of the fluid passing through pipe 1. In this manner, the output of strain gauge 7 will accurately determine the flow rate of the fluid flowing in pipe 1 by detecting any variation of the elecrical current in the conventional bridge circuit discussed hereinabove.

Although it is within the scope of the present invention to utilize a moveable shaft 5 supported by only a single leaf spring 4, the preferred embodiment of the present invention utilizes a pair of leaf springs 4 supporting moveable shaft 5 at the axial ends thereof. In this manner, moveable shaft 5 can be positionally deflected in an axial direction within pipe 1 while maintaining its substantially horizontal registration with respect to the walls of pipe 1. The accurate registration of moveable shaft 5 is necessary to insure that the force imposed on aerodynamic drag member is not altered by any angular misregistration of drag member 6. In the event only a single leaf spring 4 is used, care must be taken to insure that drag member 6 is maintained in proper registration with respect to the walls of pipe 1 and the fluid flowing therethrough.

Figure 2:
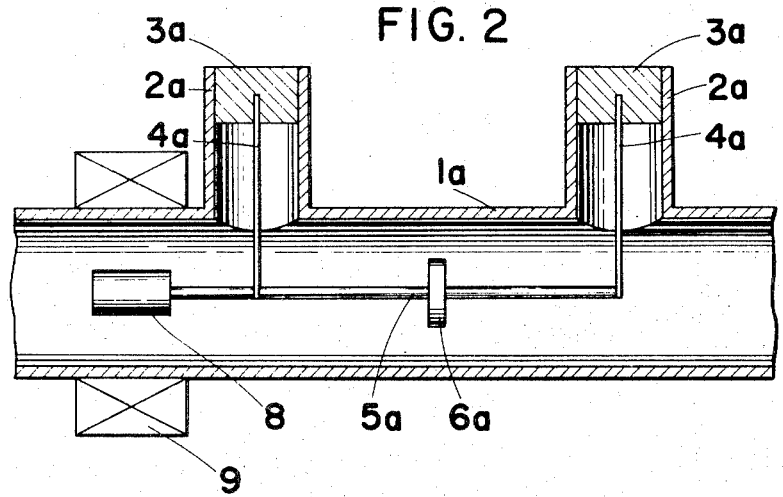
FIG. 2 is a schematic, cross-sectional view illustrating another form of a flow meter for producing a signal responsive to the axial deflection of an aerodynamic drag member.

An understanding of another form of the present invention can be best gained by reference to FIG. 2 wherein an laternate mode of detecting positional deflection is shown. For the purpose of convenience, elements corresponding to those shown in FIG. 1 have like reference numerals with the added designation of $a$. In the form of the present invention shown in FIG. 2, shaft $5a$ is axially extended and coupled to means for permitting detection of the positional deflection which can be disposed along the exterior wall of pipe $1a$. Element 8 is preferably a magnetic body which is axially mounted on the extension of moveable shaft $5a$. Where element 8 is a magnetic body, electrical deviation detector 9 is typically a magneto-striction element or a differential transformer. The operation of a differential transformer is well known to persons having skill in the art. Where element 8 is an electromagnetic core, its positional deflection will be detectable and be proportional to the mass flow of the fluid. An alternating current is supplied to the primary winding of differential transformer 9 which induces an alternating current in the secondary winding thereof. The amplitude of the output from the secondary winding is dependent upon the reluctance of the magnetic circuit, and as electromagnetic core member 8 constitutes the core of the transformer, the reluctance of the transformer unit will change with respect to the positional deflection of electromagnetic core 8. As a result, the output signal from the secondary winding of differential transformer 9 will be a signal which is responsive to the flow rate of the fluid which determines the position of electromagnetic core member 8.

Figure 3:
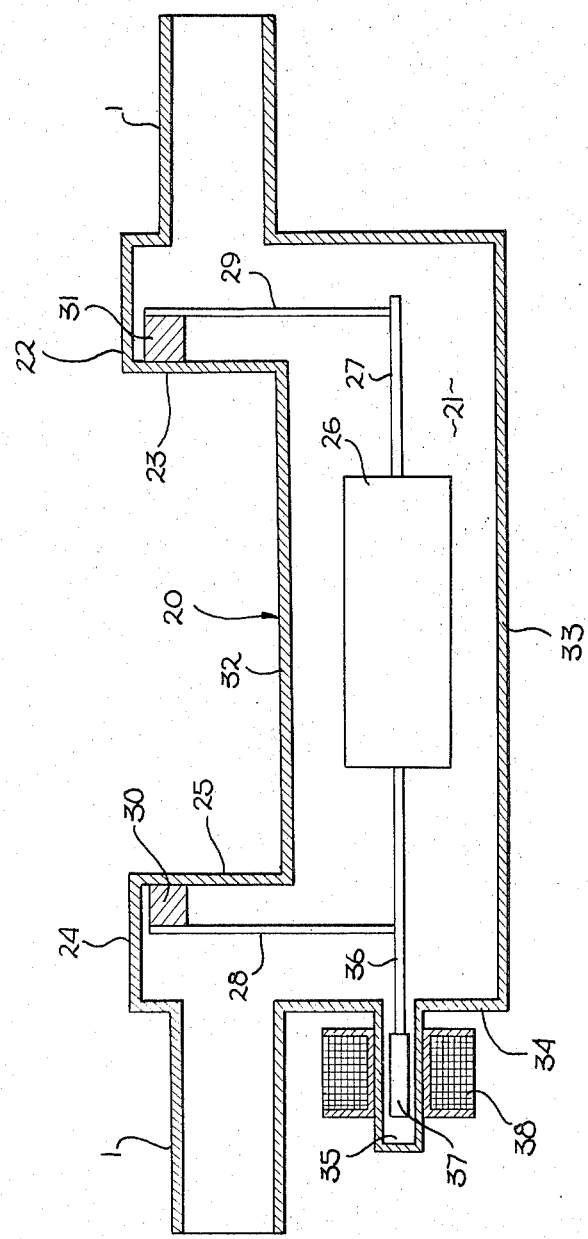
FIG. 3 illustrates a form of the present invention measuring the rate of flow of a fluid within a nonaxial flow passage.

Referring now to FIG. 3, a preferred embodiment of the present invention flow meter is shown. As mentioned previously, where very high flow rates are encountered, or where it is required to measure low flow rates in a small flow passage, a loss of pressure can become very significant thereby degrading the utility of a flow meter. As a result, the need for a large flow passage within which to measure the flow rate of the fluid becomes a material object to achieve. A preferred embodiment of the present invention is shown in FIG. 3 and is generally designated by the reference numeral 20. Flow meter 20 is interposed between axial sections of pipe 1. Flow meter 20 comprises a flow chamber 21 which has a greater cross-sectional area than that of pipe 1. Flow chamber 21 is vertically lower than the axial extensions of pipe 1 and is in communication with the axial ends of pipe 1. A first axial end of flow chamber 21 has an upwardly depending section 22 which has a first wall 23 which is in axial opposition to the open end of the respective portion of pipe 1. The other axial end of flow chamber 21 has an upwardly depending portion 24 having a first wall 25 in axial opposition to the open end of the respective section of pipe 1. The form of the present invention shown in FIG. 3 does not require predetermined cross-section geometry consistent with that of flow pipe 1 although the volume of flow chamber 21 must provide a greater cross-sectional area than flow pipe 1 and must also be vertically below the axial flow through pipe 1.

In order to produce a signal which is responsive to the flow rate of the fluid passing through pipe 1, aerodynamic drag member 26 is axially disposed within flow chamber 21. The aerodynamic drag member 26 is mounted upon shaft 27 which is supported at the axial end thereof by leaf springs 28 and 29. Leaf springs 28 and 29 are supported on mounting members 30 and 31 respectively which cantilever the attached leaf springs 28 and 29. Shaft 27 is axially disposed within flow chamber 21 and maintains aerodynamic drag member 26 along the axis of flow chamber 21. The volume intermediate aerodynamic drag member 26 and walls 32 and 33 of flow chamber 21 are substantially equal to one another. This will insure that equivalent forces are imposed along all like surfaces of aerodynamic drag member 26 by the laminar flow of the fluid flowing through pipe 1.

Wall 34 of flow chamber 21 has disposed therein cavity 35 for receiving a detection member. Shaft extension 36 is axially extended from shaft 27, shaft extension 36 having mounted thereon detection member 37. Detection member 37 is typically an electromagnetic core or other means which will permit flow rate detection external from the interior confines of flow chamber 21. Wherein an electromagnetic core member 37 is used, the external detection typically utilizes differential transformer 38. Differential transformer 38 will have an alternating current signal input thereto and will output a signal which will be responsive to the flow rate of the fluid passing through pipe 1. This will be explained in greater detail hereinbelow.

When the form of the present invention shown in FIG. 3 is in operation, the fluid passing through pipe 1 will fill flow chamber 21 and provide for a uniform distribution of fluid in flow chamber 21 and about aerodynamic drag member 26. Since the complete volume of flow chamber 21 is vertically lower than the walls of pipe 1, it can be seen that the volume intermediate walls 32 and 33 of flow chamber 21 will be filled. As the fluid moves through flow chamber 21, the force imposed by the laminar flow of the fluid will impose a force upon aerodynamic drag member 26. Since the form of the present invention shown in FIG. 3 provides an improved flow meter for measuring flow rates of high volumes of fluid or where there are very low rates of flow, the positional deflection of shaft 27 is a result of the force imposed on aerodynamic drag member 26 and is a function of the resistance of leaf springs 28 and 29. The positional deflection of aerodynamic drag member 26 will terminate when the force imposed thereon is equivalent to the existing force of leaf springs 28 and 29. Cavity 35 communicates with flow chamber 21 and will be substantially free of eddy currents or other turbulence caused by the fluid. Electromagnetic core member 37 will be positionally deflected as a result of the force imposed on aerodynamic drag member 26. Since leaf springs 28 and 29 maintain the horizontal integrety of shaft 27 by limiting the axial deflection thereof, any deviation from the axis of flow chamber 21 will be negligible.

As stated above, when an input alternating current signal is applied to the primary winding of differential transformer 38, a signal will be induced in the secondary winding which is dependent upon the reluctance of the magnetic circuit. Since electromagnetic core member 37 will be deflected as a function of the force imposed by the laminar flow of the fluid, the reluctance of the magnetic circuit will vary as a function of the flow rate of the fluid. The amplitude of the output signal of the secondary winding of differential transformer 38 will change as a function of the change in the reluctance of the magnetic circuit and therefore as a function of the flow rate of the fluid. Although it is within the scope of the present invention to use a strain gauge on leaf springs 28 or 29, or other like transducer elements to yield a signal responsive to the fluid flow, the preferred embodiment of the present invention is shown in FIG. 3.

The preferred form of the present invention shown in FIG. 3 provides a flow meter which is capable of measuring flow rates which are very high as well as measuring very low flow rates. By providing a flow chamber and mounted aerodynamic drag member which will not deleteriously effect the flow of the fluid and thereby inject pressure drops which will deleteriously affect the resultant measurement, the present invention provides a flow meter which solves problems which have been left unsolved by the devices disclosed in the prior art.

We claim:
1. A flow meter for detecting the rate of fluid flow through a flow passage comprising:
   a. a flow chamber having a cross-sectional area which is greater than the cross-sectional area of the flow passage, said flow chamber having an upper wall which is below a lowest point of the flow passage adjacent said flow chamber, said flow chamber having first and second ends in communication with and disposed intersticial to the flow passage;
   b. a drag member being axially disposed within said flow chamber and supported by a pair of shaft members at the longitudinal ends thereof, said shaft members being in axial registration with said flow chamber;
   c. first and second resilient means for providing a flexing mount along the axis of said flow chamber, said first and second resilient means each coupled to an axial end of one of said shaft members respectively;
   d. positional deflection means for providing positional indicia responsive to the axial movement of said drag member, said positional deflection means coupled to and aligned with one of said pair of shaft members; and
   e. detection means for producing an electrical signal responsive to the positional indicia of said positional deflection means, said detection means being in juxtaposition to said positional deflection means and external to said flow chamber.

2. A flow meter as defined in claim 1 wherein said flow chamber includes a cavity disposed in an axial wall thereof in aligned registration with one of said shaft members, said positional deflection means being disposed within and spaced from the walls of said cavity.

3. A flow meter as defined in claim 2 wherein said positional deflection means is an electromagnetic core and said detection means is a differential transformer, the windings of said differential transformer being adjacent the external wall of said cavity.

4. A flow meter as defined in claim 1 wherein the first and second ends of said flow chamber each comprise an upwardly depending portion at least coextensive with the top of the flow passage and having a wall in axial opposition to the flow passage.

5. A flow meter as defined in claim 4 wherein said first and second resilient means comprise a pair of leaf springs, each coupled to the wall of the upwardly depending portion of said flow chamber which is in axial opposition to the flow passage.

* * * * *